United States Patent [19]

Cohen

[11] 4,184,482
[45] Jan. 22, 1980

[54] SOLAR ENERGY COLLECTING SYSTEM

[76] Inventor: Eli Cohen, 350 Continental Ave., Paramus, N.J. 07652

[21] Appl. No.: 946,957

[22] Filed: Sep. 29, 1978

[51] Int. Cl.² ............................. F24J 3/02; F25F 7/00
[52] U.S. Cl. .................................... 126/438; 126/451; 126/425; 165/80 R; 126/426
[58] Field of Search ............... 126/271, 270; 237/1 A; 165/80

[56] References Cited

U.S. PATENT DOCUMENTS

| | | | |
|---|---|---|---|
| 4,022,184 | 5/1977 | Anderson | 126/271 |
| 4,038,972 | 8/1977 | Orrison | 126/271 |
| 4,051,834 | 10/1977 | Fletcher et al. | 126/271 |
| 4,078,549 | 3/1978 | McKeen et al. | 126/271 |
| 4,098,264 | 7/1978 | Brokaw | 126/271 |
| 4,106,480 | 8/1978 | Lyon et al. | 126/271 |
| 4,119,365 | 10/1978 | Powell | 126/271 |

*Primary Examiner*—Samuel Scott
*Assistant Examiner*—Daniel J. O'Connor
*Attorney, Agent, or Firm*—Weingram & Klauber

[57] ABSTRACT

A solar energy collecting system is disclosed, especially adapted for suspended installation from overhead support members at a roof or other enclosure which includes energy-transmissible portions for enabling the solar energy to be rendered incident on the system. The system comprises a flexible, relatively thin sheet, which includes a solar energy-reflecting surface. Frame means are provided, which are securable to a plurality of parallel spaced, strip-like zones on the sheet, the frame means being adapted to form the sheet at the said zones into parabolic arcs, with the reflective surface residing on the concave side of such arcs. The frame means are adapted to maintain the sheet in a taut condition between the spaced parabolically-arced zones, thereby maintaining the sheet in the configuration of a line-generated parabolic surface. Energy conversion means are disposed along the line of foci of the surface, for receiving reflected solar energy and converting same into a further utilizable energy form. Support means are provided for the frame means and energy conversion means, for disposing the system to receive incident solar energy onto the concave parabolic surface; and means are provided for rotating the frame means together with the parabolic surface about the line of foci, to at least partially track the incident solar radiation.

10 Claims, 5 Drawing Figures

SOLAR ENERGY COLLECTING SYSTEM

BACKGROUND OF THE INVENTION

This invention relates generally, to solar energy utilization devices, and more specifically relates to a system for collecting and converting solar energy into other utilizable forms of energy.

Within recent years, a comparatively enormous amount of interest has developed in devices and methodology useful in the conversion of solar energy into alternate forms of energy, which may then be more readily utilized and/or stored. In most instances, these devices are characterized by an extended surface which may be so disposed that the solar energy incident upon the surface is collected by the device. Often the solar energy is thus redirected by the surface, which can e.g. be a focusing device, so as to heat some type of target; or the energy similarly, can be otherwise concentrated or refocused onto other types of energy-conversion means, such as photovoltaic cells or the like. Other types of devices have also come into wide-spread use, as for example flat plate collectors, which may be associated with enclosures and/or tubing or the like; the latter can carry a fluid media, so that resultant heating of the flat plate and associated structure, can in turn raise the temperature of the media, which can be a circulating liquid or so forth.

While solar energy devices and apparatus of the aforementioned type have increasingly found acceptance including in home and industrial environments, this in larger part, has not resulted because of reduction of costs or complexity of the solar energy devices. Rather, the increasing acceptability of such apparatus and systems is in good part explained rather by the soaring costs of other forms of energy, such as fossil fuel-generated electricity, fuel gas and the like. Basically, however, observation will indicate that solar energy equipment—despite the inroads aforementioned—has made relatively limited penetration of environments such as in home applications, wherein the yet comparatively high costs of such equipment continues to present a significant barrier to acceptance of same.

Thus for example, it may be noted that the previously mentioned flat plate collectors—while less complex and expensive than concentrator devices—still are quite costly; and in view of their construction, are relatively inefficient. The concentrators, such as parabolic reflectors or the like—while capable of collecting energy efficiently, and heating a fluid media or activating photocells or the like with great efficacy—are considerably more expensive than the flat plate collectors, in that the said devices have to present, been designed and manufactured with the high precision deemed necessary for a relatively precise optical device.

Pursuant to the foregoing, it may be regarded as an object of the present invention, to provide a solar energy collecting system which is of simple, relatively inexpensive design; which is yet sophisticated and efficient in its mode of energy collection; and which is especially adapted to relatively low-cost installations; such as in average homesites, including those at typical latitudes of the temperate zones.

SUMMARY OF THE INVENTION

Now in accordance with the present invention, the foregoing object, and others as will become apparent in the course of the ensuing specification, are achieved in a solar energy-collecting system which is especially adapted for suspended installations, e.g. from overhead support members at a roof or other enclosure, which roof or enclosure includes energy transmissible portions for enabling the solar energy to be rendered incident on the system.

The system comprises a flexible, relatively thin sheet, which sheet includes a solar energy-reflecting surface. Frame means are provided which are securable to a plurality of parallel, spaced, strip-like zones on the sheet. The frame means thereby serves to form the sheet at the secured zones, into parabolic arcs, with the reflective surface residing on the concave side of such arcs.

The frame means are adapted to maintain the sheet in a taut condition between the spaced, parabolically-arced zones, thereby maintaining the flexible sheet in the configuration of a line-generated parabolic surface. Energy conversion means are disposed along the geometric line of foci of this parabolic surface, for receiving reflected solar energy from the surface, and converting same into a further utilizable energy form. Such means may, for example, take the form of a hollow, tubular member with heat-transmissible walls, which member may carry water or other fluid which is heated by the refocused solar energy. Similarly, a tubular member as mentioned, can be transmissible to actinic radiation for photo-voltaic cells which are mounted within the said tubes; or such photo-voltaic or other types of photo-activated cells or photo-energy conversion devices can be otherwise disposed (e.g. by direct mounting) along the said line of foci.

Support means are provided for the frame means and solar energy conversion means, to enable disposition of the system to receive incident solar energy onto the concave reflective side of the parabolic surface; and means are provided for rotating the frame means together with the parabolic surface about the line of foci, to enable at least partial tracking of the incident solar radiation.

The frame means may comprise a plurality of mutually-spaced frame members, which can be suspended in journaled fashion from an overhead point, such as from the tubular member which as aforementioned, can comprise the energy conversion means. These frame members may include a downwardly convex, parabolically-arced portion at the bottom of same, which portion is adapted to secure the said sheet, as for example by being formed as a pair of hinged jaws which sandwich the aforementioned thin sheet to thereby form same into the desired parabolically-arced form.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
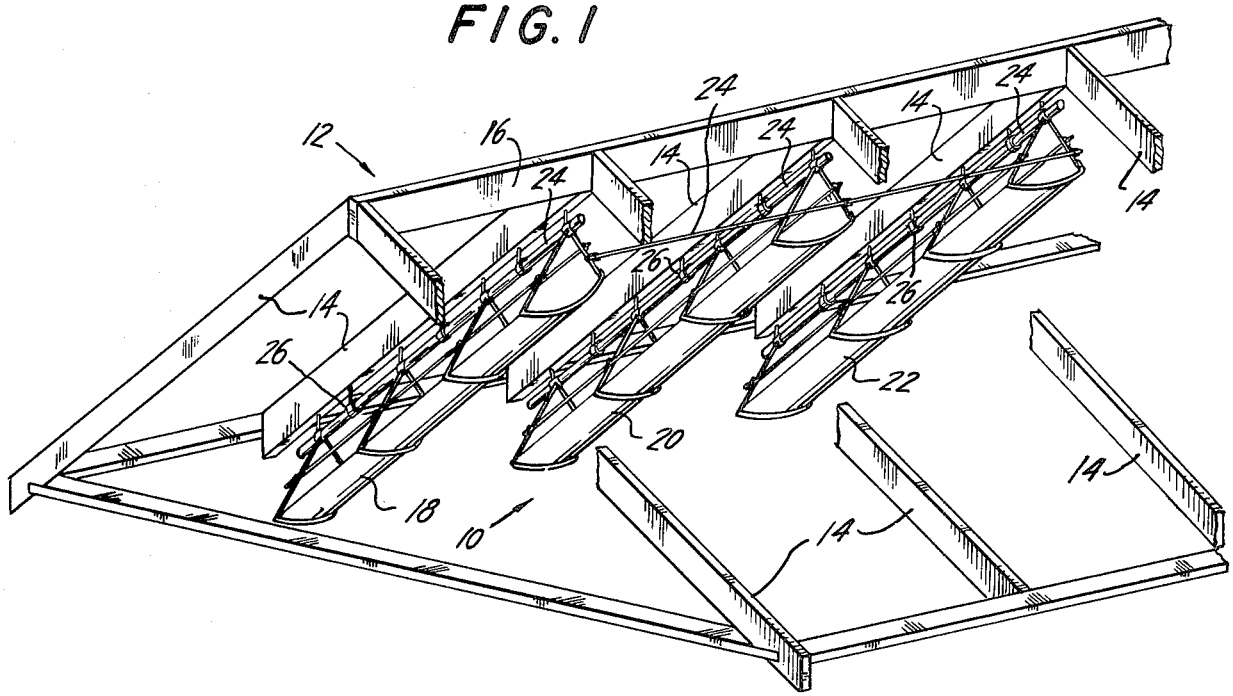
FIG. 1 is a perspective view of a system in accordance with the invention, installed at the enclosed roof of a typical dwelling.

In FIG. 1 herein, a perspective view appears of a solar energy-collecting system 10, generally in accord with the present invention. The view of FIG. 1 may be considered simultaneously, especially with the view of FIG. 2, which enlarges two of the plural solar energy-collecting units, in order to render details of same more readily apparent.

The view of FIG. 1 depicts the system 10 in association with a typical dwelling roof, the framing of which is generally indicated at 12. The said roof is shown in schematic and broken-away fashion, and illustrates the manner in which system 10 may be effectively mounted.

Thus, there is shown in this Figure, as forming the upper part of said roof framing 12, a plurality of rafters 14 which, as is conventional, are secured to an upper ridge board 16. In this installation, it is contemplated that the system 10 may be secured to and suspended from the overhead support provided by the rafters 14. It will, however, become apparent from the ensuing specification, that the installation in this peak-type roof framing, is merely representative of an installation suitable for the present system, which may readily be installed in numerous other building structures which include overhead beams, rafters or the like, from which the said system may be readily suspended in the manner which will now be discussed; and it will be similarly evident that the said system can be effectively mounted in other static enclosures which do not necessarily form part of dwellings or so forth.

System 10 is seen to comprise a plurality of solar energy-collecting units—three such units, 18, 20, and 22, being shown in the FIG. 1 depiction. Two of these units, namely, units 18 and 20, are seen in the enlarged view of FIG. 2. It will be apparent from the present discussion, that the number of such units which may be utilized in a given installation, may vary in accordance with the accessible roof area, with the general climactic conditions of the region in which the dwelling or other structure is situated; and also in accordance with the length or extension of a given unit. Thus, in the installations of FIGS. 1 and 2, each unit such as unit 18 or 20, extends in length for about the length of the rafter 14, from which the unit is suspended. It will be clear that the overall length of a given unit can thus vary in accordance with the characteristics of the region of suspension.

Figure 5:
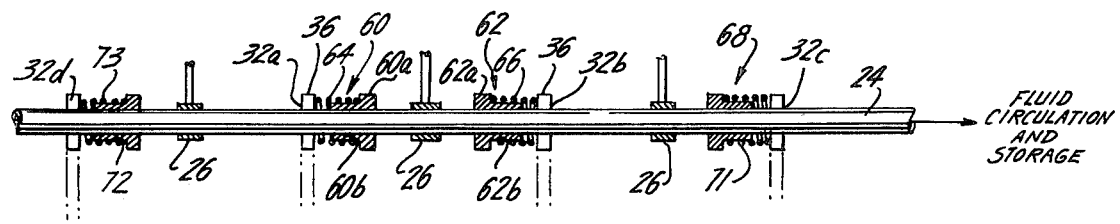
FIG. 5 is an elevational view of the tubular energy conversion means utilized in the systems of FIGS. 1 and 2, and illustrates the manner in which the frame members are suspended where the said tubular member comprises the suspension point.

Pursuant to the invention, it is seen that a tubular member 24 is suspended from rafter 14 by means of hangers 26 (also see FIG. 5). Tubular member 24 in general, serves as an energy conversion means, in the sense that solar energy rendered incident upon same by means of the reflector structure to be shortly discussed, is converted at member 24 into a further utilizable energy form. Preferably, the member 24 is a hollow tube or pipe of heat conductive material such as copper or the like. As is indicated in FIG. 5, a fluid (usually water), is circulated through the hollow interior of tube 24. The said fluid is heated in consequence of such passage; and then provided to a utilization or buffer storage tank or the like, as is known in the art.

Pursuant to a principal aspect of the invention, a relatively thin sheet 30 of flexible material is provided, e.g. a several mil layer of a conventional tough plastic, such as a polyester film (e.g. "Mylar"), which plastic film is provided with a metallized solar energy-reflecting surface 35 (e.g. of aluminum) on at least the side thereof facing in an upward direction. The said flexible plastic sheet is pulled or stretched taut and formed into a line-generated parabolic surface by a frame means to which the said sheet 30 is secured.

Figure 2:
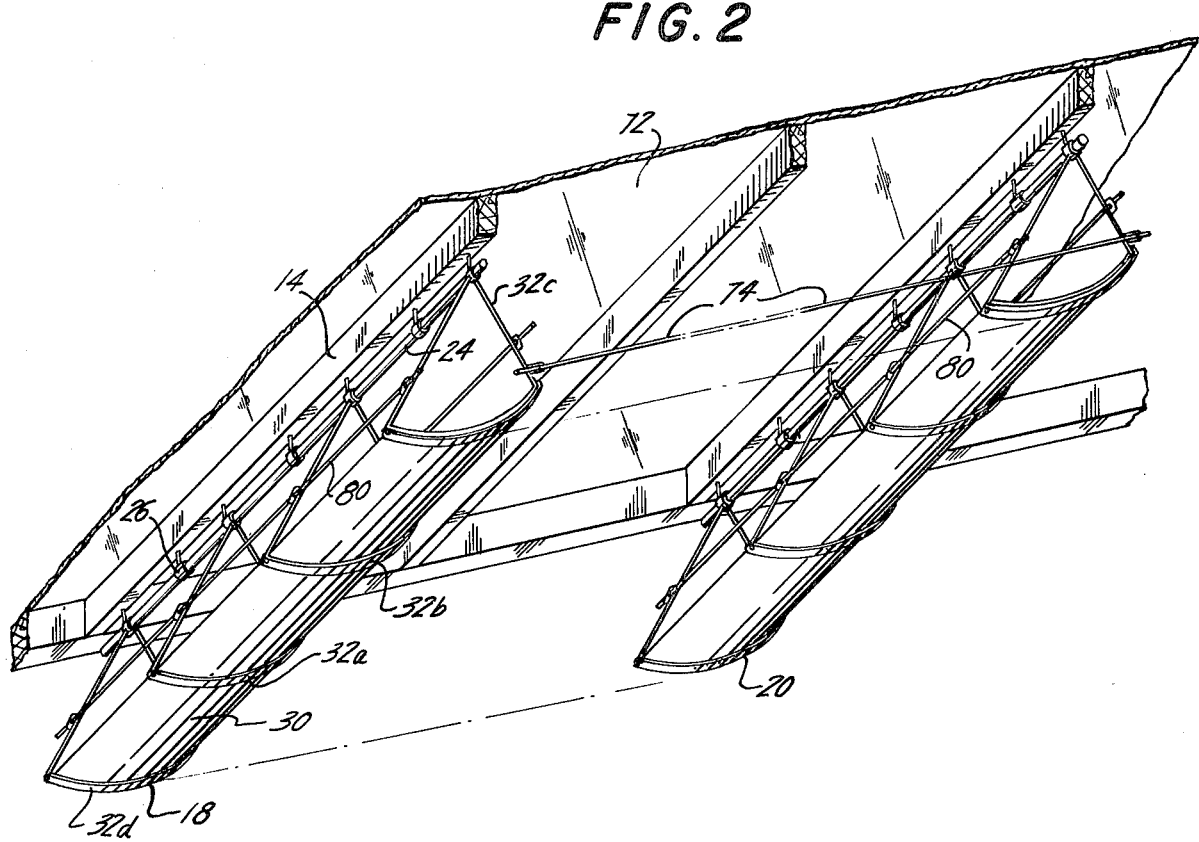
FIG. 2 is an enlarged perspective view of a portion of FIG. 1, illustrating in detail, aspects of the present system.
Figure 4:
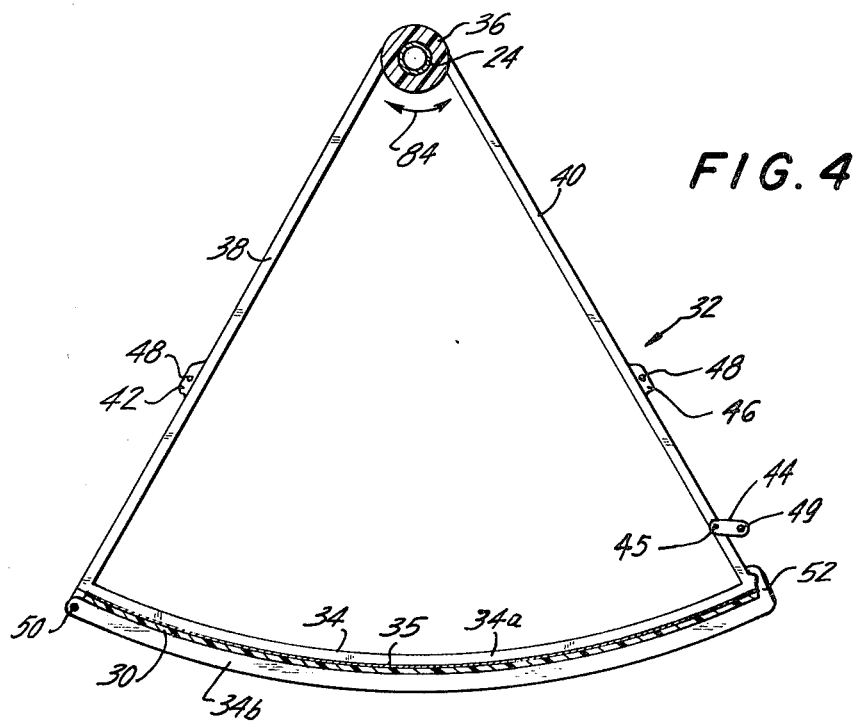
FIG. 4 is a plan view, partially sectioned, of one of the frame members forming part of the present system.

The frame means comprise a plurality of separate frame members 32, the details of which may be seen in the plan view of FIG. 4 (successive frame members are identified in FIG. 2 as 32a, 32b, etc.). As seen in that Figure, frame means 32 is of generally sector-like shape; more specifically, however, the lowermost arc-like portion 34 is actually a parabolic arc—rather than a circular arc. Frame member 32 is preferably of light weight construction—e.g. the entire member can comprise molded plastics or the like, and is thus seen to comprise at its upper or apex end, a sleeve 36 which is preferably formed of a heat resistant plastic possessing self-lubricating properties, such as teflon or other known formulations of TFE and FEP fluoroplastic resins. The said formulations are desirable in that—as seen in the Figures herein—the said sleeve 36 preferably serves to suspend frame member 32 from tubular member 24, which member is encircled by sleeve 36. Since frame member 32, in accordance with the invention, will undergo periodic angular rotation about member 24, which as already discussed, normally carries a high temperature liquid, the aforementioned properties of lubrication and high heat resistance are significant for present purposes.

A pair of arms 38 and 40 are joined to sleeve 36, and extend downwardly from same in diverging fashion, to in turn, join the arced portion 34. A pair of ears 42 and 46—each including a central opening 48—are provided, one such ear on each arm 38 and 40. In the instance of at least the frame member 32c, a connecting link 44 is pivotably secured at 46 to arm 40. The link 44 includes an opening 49 to which connection may be made of a rod 74, for reasons as will be discussed.

The arced portion 34 of member 32, is seen to include an upper portion 34a, which can be integrally or otherwise formed with arms 38 and 40, and a lower portion 34b, which is secured to the remainder of the frame member via a hinge 50. It is seen that the end of portion 34b opposite the hinge, includes an upwardly extending lip 52, which can deform slightly about the adjacent face of arm 40, to serve as a catch.

In particular, it will be apparent that the portions 34a and 34b form opposed jaws; and that by opening the said jaws, i.e. by swinging portion 34b in a downward direction, one may engage (to sandwich) the sheet 30 between the said jaws, which are then closed—thereby restraining the sheet where thus grasped, and also deforming the sheet in the zone at which same is grapsed into a parabolic arc, conforming to the shape of portion 34.

By referring to FIGS. 2, 4 and 5, the general mode of operation of the present invention may now be appreciated. In particular, it will be seen that each of the plurality of frame members 32 is suspended from the tubular member 24, which in turn, is suspended from a rafter 14. Further, each of the said members 32, is engaged with the flexible sheet 30, the upper surface of which carries the metallized, i.e. solar energy-reflecting layer 35.

Each of the said frame members—as already mentioned—serves to deform the sheet into a zone extending across same, which conforms to the parabolic arc represented by portion 34 of the frame member 32—each of these zones therefore being parallel to one another on the sheet.

Pursuant to a further aspect of the invention, it will be appreciated that the said film, being flexible and (if plastic) to at least a degree stretchable, would not in total be deformed into the line-generated parabolic surface desired, without introducing some tautness between the aforementioned zones of deformation. Referring to FIG. 5, a preferred manner of maintaining the said tautness is illustrated, i.e. by establishing a force between adjacent frame members 32, tending to render the sheet therebetween in a taut condition.

Thus, and referring firstly to the frame members 32a and 32b, which are the central two members associated with a unit such as unit 18, it is seen, that clamped sleeves—as at 60 and 62—are provided, such sleeves being secured about tubular member 24 and retained at a fixed position with respect to same, i.e. either by frictional engagement or by being joined to same with suitable adhesives or the like. Each sleeve 60, 62 includes an enlarged head 60a and 62a, and a reduced shank 60b and 62b. In each instance a biasing spring 64 and 66, is received about the shanks 60b and 62b. Thus, it will be clear that the rearward end of each spring bears against the enlarged head 60a or 62a, and the forward ends of each spring may bear against the adjacent sleeves 36 of the associated frame member—the net result being to provide a biasing force tending to displace the frame members 32a and 32b away from each other to maintain a taut condition in the sheet therebetween.

It is further seen in FIG. 5, that tautness is maintained in sheet 30, as between the frame members 32b and 32c (i.e. the members at the right-hand side of a unit 18) by means of a further clamping sleeve 68, which acts in the manner previously discussed—in this instance the spring 71 serving to displace or bias the frame member 32c to the right in the sense of the drawing of FIG. 5. Similarly, the frame member 32d (at the left end of unit 18) is displaced to the left in the sense of the drawing by the further clamping sleeve 70 interacting with biasing spring 73.

Pursuant to operation of the invention, it is desired in general, to effect movement of the parabolic surface which is constituted by sheet 30, as the sun moves across the sky in its overhead traverse. In this connection, it is thus assumed that the regions immediately overlying system 10, are substantially transparent to incident solar radiation—at least in the wavelengths of interest for the present purposes. Thus for example, it may be assumed that glass 72 is provided in the region between the adjacent rafters 14.

Figure 3:
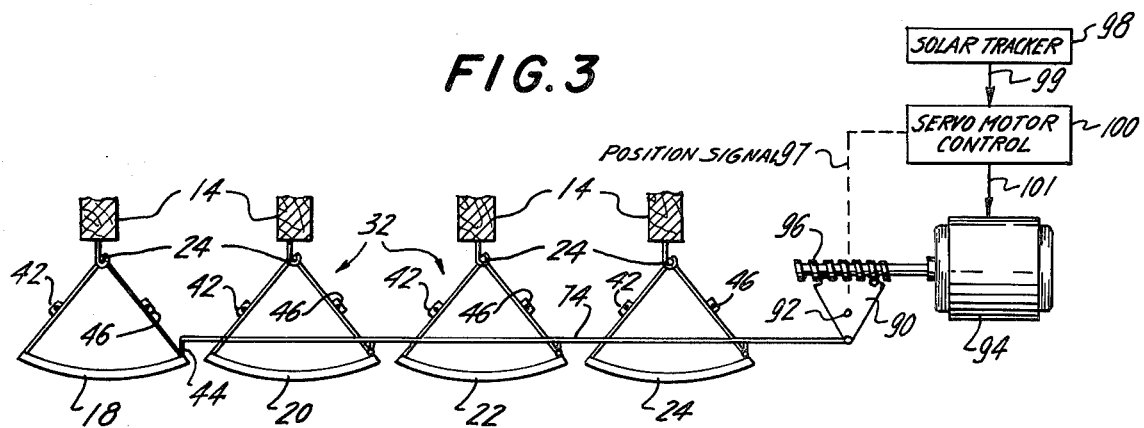
FIG. 3 is an end elevational, somewhat schematic view, of the system of FIG. 1, depicting the manner in which rotation of the frame means to enable solar tracking, is effected.

Pursuant to the invention, it is seen in FIGS. 2 and 3, that an actuating means, such as a rod 74 or the like is connected (by a pin or the like) to the opening 49 of link 44 provided at the frame member 32c which is at one end of each collecting unit 18, 20, etc. Rigid rods 80 are passed through the ears 42 and 46 of each frame member 32a, 32b, etc. forming part of a unit, so that it will be clear that the unit as a whole, can angularly rotate in the directions of arrows 84 (FIG. 4) in consequence of displacement of rod 74.

Such displacement can be effected by any simple means, the object of such displacement being to move the said reflective units to maximize incident solar radiation thereupon as the sun tracks. Here it will be appreciated, that the rotation 84 is in but one direction, i.e. the present units 18 etc., have only a single degree of freedom. Accordingly, it will be clear that tracking of the sun in the present instance, will in general be intended only to accord with the azimuthal position of the sun—there is no necessity nor interest in simultaneously tracking the altitude of the sun.

Thus, it is seen that the rod 44 is displaced by means of a modified rack and pinion, i.e. a rotatable rack gear 90 is provided, which can rotate about an axis 92. Rotation of gear 90 is effected by actuation of servo-motor 94, via the worm 96 which interacts with gear 90. The tracking operation is conventional. In particular, a conventional solar tracker 98 provides a signal at 99 indicative of the azimuthal position of the sun. An angular position signal is provided at 97 from gear 90 to servo-motor control 100, which also receives the solar tracker signal. Servo-motor control 100 periodically actuates servo-motor 94 via line 101, in order to assure that the angular position of the said units 18 etc. are in accord with the azimuthal position of the sun, as indicated by the signal from tracker 98.

It will be understood that while the frame members 32 are in the preferred embodiment of the invention here illustrated, suspended from tubular member 24, it is also within the province of the invention for such members to be otherwise suspended from overhead supports such as rafters 14, as to enable the angular rotation of same as in the directions 24 of FIG. 4.

Thus while the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:
1. A solar energy-collecting system, comprising in combination:
    a flexible, relatively thin film including a solar energy-reflecting surface;
    a plurality of frame members, one each of which is secured to one of a plurality of parallel, spaced strip-like zones on said film, said frame members being parabolically arced at the portion thereof secured to said zones on said film, said members thereby forming said film at said zones into parabolic arcs, with said reflective surface residing on the concave side of said arc;
    means for generating a biasing force between adjacent spaced frame members tending to displace same away from one another to thereby pull and maintain said film in a taut condition between said spaced parabolically arced zones, thereby maintaining said flexible film in the configuration of a line-generated parabolic surface;
    energy conversion means disposed along the line of geometric foci of said parabolic surface for receiving reflected solar energy from said surface and converting same into a further utilizable energy form;
    support means for said frame means and energy conversion means for disposing said system to receive incident solar energy onto the concave side of said parabolic surface; and means for rotating said frame means together with said parabolic surface about the said line of foci, to enable at least partial tracking of incident solar radiation.

2. A system in accordance with claim 1, wherein said energy conversion means comprises a tubular member, and wherein said frame members are suspended and journalably supported from said tubular member for enabling said rotating.

3. A system in accordance with claim 2, wherein each frame member including a pair of arms diverging in a downward direction from a suspension region, a parabolically arced portion joining the diverged lower ends of said arms and being adapted for securing to said sheet.

4. A system in accordance with claim 3, wherein said arced portion comprises a pair of hinged opposed jaws adapted for grasping and sandwiching said sheet therebetween.

5. A system in accordance with claim 2, wherein said tubular member is a heat conductive hollow cylinder and carries a liquid for absorbing incident energy as heat.

6. A system in accordance with claim 1, wherein said energy conversion means comprises means for converting said incident solar energy to an electrical output.

7. A solar energy-collecting system for suspended installation from overhead support members at a roof or other enclosure including energy transmissible portions for enabling solar energy to be rendered incident on said system, said system comprising:

a plurality of solar energy-collecting units, each said unit comprising:

a flexible, relatively thin film including a solar energy-reflecting surface;

a plurality of frame members, one each of which is secured to one of a plurality of parallel, spaced strip-like zones on said film, said frame members being parabolically arced at the portion thereof secured to said zones on said film, said members thereby forming said film at said zones into parabolic arcs, with said reflective surface residing on the concave side of said arc;

means for generating a biasing force between adjacent spaced frame members tending to displace same away from one another to thereby pull and maintain said film in a taut condition between said spaced parabolically arced zones, thereby maintaining said flexible film in the configuration of a line-generated parabolic surface;

energy conversion means disposed along the line of geometric foci of said parabolic surface for receiving reflected solar energy from said surface and converting same into a further utilizable energy form;

support means for said frame means and energy conversion means for disposing said unit to receive incident solar energy onto the concave side of said parabolic surface; and means for rotating said frame means together with said parabolic surface about the said line of foci, to enable at least partial tracking of incident solar radiation.

8. A system in accordance with claim 7, wherein said plural units are mounted with their said lines of foci parallel; and further including common means for commonly effecting said rotation of each said unit to enable said tracking.

9. A system in accordance with claim 8, wherein said energy conversion means comprises a tubular member, and wherein said frame members are suspended and journalably supported from said tubular member for enabling said rotating.

10. A system in accordance with claim 9, wherein each frame member includes a pair of arms diverging in a downward direction from a suspension region, a parabolically arced portion joining the diverged lower ends of said arms and being adapted for securing to said sheet.

* * * * *